US005962001A

United States Patent [19]

Rose et al.

[11] Patent Number: 5,962,001

[45] Date of Patent: Oct. 5, 1999

[54] DISINFECTING AND SANITIZING ARTICLE

[75] Inventors: Edward S. Rose, Leawood, Kans.; Raymond G. Wile, Liberty, Mo.

[73] Assignee: Illinois Tool Works, Inc., Glenview, Ill.

[21] Appl. No.: 08/963,342

[22] Filed: Nov. 3, 1997

[51] Int. Cl.[6] ........ A01N 25/34

[52] U.S. Cl. ........ 424/404; 424/405

[58] Field of Search ........ 424/404, 405; 428/284, 286, 288–290, 296, 340–1

[56] References Cited

U.S. PATENT DOCUMENTS

| | | | |
|---|---|---|---|
| Re. 31,885 | 5/1985 | Meitner | 252/191 |
| 3,200,036 | 8/1965 | Greenblatt | 167/38.6 |
| 3,277,013 | 10/1966 | Gianladis | 252/153 |
| 3,619,251 | 11/1971 | Stiles, Sr. | 117/56 |
| 3,965,518 | 6/1976 | Muolo | 15/104.93 |
| 4,133,921 | 1/1979 | Palcher | 427/355 |
| 4,336,151 | 6/1982 | Like et al. | 252/106 |
| 4,364,746 | 12/1982 | Bitzer et al. | 51/298 |
| 4,448,704 | 5/1984 | Barby et al. | 252/91 |
| 4,665,580 | 5/1987 | Morris | 15/118 |
| 4,666,621 | 5/1987 | Clark et al. | 252/91 |
| 4,753,844 | 6/1988 | Jones et al. | 428/288 |
| 4,775,582 | 10/1988 | Abba et al. | 428/288 |
| 4,784,786 | 11/1988 | Smith et al. | 252/91 |
| 4,808,328 | 2/1989 | Flohr | 252/91 |
| 4,833,003 | 5/1989 | Win et al. | 428/198 |
| 4,853,281 | 8/1989 | Win et al. | 428/286 |
| 4,927,556 | 5/1990 | Pokorny | 252/173 |
| 4,931,201 | 6/1990 | Julemont | 252/91 |
| 4,974,763 | 12/1990 | Widrig | 224/252 |
| 5,094,770 | 3/1992 | Sheridan et al. | 252/91 |
| 5,141,803 | 8/1992 | Pregozen | 428/288 |
| 5,234,719 | 8/1993 | Richter et al. | 427/384 |
| 5,683,971 | 11/1997 | Rose et al. | 510/130 |

FOREIGN PATENT DOCUMENTS

| | | |
|---|---|---|
| 0068722 | 5/1983 | European Pat. Off. . |
| 0256950 | 2/1988 | European Pat. Off. . |
| 0573277 | 8/1993 | European Pat. Off. . |
| 0842866 | 7/1960 | United Kingdom . |
| 2179052 | 2/1987 | United Kingdom . |

OTHER PUBLICATIONS

Atlas, Formulary of Typical Pharmaceutical Formulations for Topical Application Illustrating the Use of ATLAS Surfactants and Sorbitol. pp. 39–43.

Coleman, D–Limonene As A Degreasing Agent. The Citrus Industry, Nov., 1975. vol. 56. p. 23–25.

Procter & Gamble, Jergens Liquid Soap, Aug. 22, 1986. p. 1.

Lazurosak, Waterless Hand Cleaners and Barrier Creams, Detergents and Specialties, Apr., 1969. p. 26, 28, 73.

Georghegan, et al., Waterless Hand Cleaners, Soap & Chemical Specialties, Aug., 1969. p. 54–56, 82.

*Primary Examiner*—Jose' G. Dees
*Assistant Examiner*—Kathryne E. Shelborne
*Attorney, Agent, or Firm*—Shook, Hardy & Bacon L.L.P.

[57] ABSTRACT

A disinfecting and sanitizing article comprises a substrate capable of absorbing and retaining a fluid and having two opposed surfaces wherein at least one surface is abrasive, and a nonabrasive liquid formulation for disinfecting and sanitizing is absorbed in the substrate, the liquid formulation comprising an oil-in-water emulsion, whereby initial disinfecting and sanitizing action is achieved by the combination of the abrasive surface of the substrate and the liquid formulation, and further disinfecting and sanitizing action is achieved after the biofilm is broken or dissolved by a combination of the emulsion and the abrasive substrate. Additional disinfecting and sanitizing action is achieved by the absorption of the pathogens into the substrate which has been saturated with disinfectants and sanitizers. The substrate can comprise a cloth-like towel.

10 Claims, No Drawings

DISINFECTING AND SANITIZING ARTICLE

BACKGROUND OF THE INVENTION

This invention relates to cleaners and cleaning articles. More particularly, this invention relates to a disinfecting and sanitizing article.

Disinfectant and sanitizer compositions generally contain germ-killing chemicals of many different types and combinations with the specific intent of killing targeted pathogens. Some of these compositions are phenols, quaternary ammonium chlorides, glutaraldehydes and iodines. These formulations may contain surfactants generally of the non-ionic nature if cleaning properties are also desirable, and water to dilute the germ-killing chemicals to a safe user level. Other miscellaneous additives may also be used, such as perfumes, dyes, wetting agents, phosphates, silicates and solvents, to accomplish specific uses. These products can typically be offered in highly dilutable concentrations of up to one part of disinfectant and sanitizer to 256 parts of water. They may also be purchased in ready-to-use concentrations.

These types of products have to show complete kill of specific pathogens as required by the EPA to be registered for sale to the public. This kill ability is based on accepted laboratory tests under controlled environmental conditions, and kill rate of each pathogen is measured in contact time, which can vary from a few seconds to 20 minutes or longer. Also, the pathogens under conditions in laboratory testing are not contained in hard to remove biofilms such as are formed by dried blood, food grease, saliva and body fluids, which are typically found in actual use conditions in hospitals, nursing homes, restaurants, and many other sources of contamination. Biofilms are organic films or conglomerates under which pathogens can be located.

Disinfecting and sanitizing cleaners are useful for preventing the spread of harmful bacteria. They are usually sprayed onto a surface and then wiped with a towel. Many existing products must be sprayed several times to ensure that the disinfectant and/or sanitizer contacts the harmful bacteria or pathogens on the treated surface for a sufficient minimum contact time. In addition, many of these cleaners must be rinsed from the treated surface since they are toxic.

Disinfecting and sanitizing cleaners typically contain large amounts of alcohol or other solvents which, disadvantageously, results in rapid evaporation from the treated surface so as not to provide sufficient contact time to ensure complete kill of the pathogens, or to fully penetrate the biofilm deposited on the surface being disinfected and sanitized. This latter problem is especially insidious because germs breed underneath the biofilm and in the biofilm, as well as on the surface of the biofilm. Therefore, a cleaner which only works on the surface of a film is not able to thoroughly disinfect and sanitize, and when bacteria remains on the treated surface, it begins to produce an odor. In addition, such cleaners are ineffective even on biofilm surfaces because germs are not exposed to these cleaners for the required minimum contact time to assure complete pathogen kill.

Another disadvantage with the present methods of disinfecting and sanitizing surfaces is that they often require a number of steps. In fact, for currently available disinfectants and sanitizers to be effective, the surface must first be precleaned. For instance, simply spraying a surface with a cleaner and then wiping does not fully disinfect and sanitize. Therefore, a disinfecting and sanitizing process may require first cleaning a surface, next spraying a liquid composition onto a surface and rubbing the sprayed liquid with a towel, then rinsing the cleaner off the surface, and finally drying the surface with another towel. In addition, for the process to be truly effective, the surface must be kept wet by the cleaner, such as by re-spraying, to ensure that the disinfectant and sanitizer contact the bacteria for a certain minimum time to achieve complete pathogen kill. In addition to the numerous steps required for the present methods of disinfecting and sanitizing surfaces to be effective, spray-type systems currently available have the additional disadvantage of allowing low viscosity liquid cleaners to run from the surface area to be treated onto other surfaces which one does not want exposed to the cleaner. Furthermore, for current systems to actually penetrate a biofilm layer, they must utilize abrasive materials which can also scratch the surface being disinfected and sanitized.

A further disadvantage of current disinfecting and sanitizing systems is that many have limited disinfecting and sanitizing properties. For instance, the systems may kill only certain subclasses of bacteria. In other words, the systems may not have fungicidal, pseudomonacidal, tuberculocidal, bactericidal, and virucidal properties all combined within one system.

Thus, these conventional disinfectant and sanitizer solutions have not proven to be effective in actual use conditions versus controlled laboratory environments. The three main reasons for their ineffectiveness are failure to completely remove the biofilm that contains the pathogens; insufficient contact time with the pathogen to complete a 100% kill; and the use of unsatisfactory cleaning towels that are necessary in current usage of disinfectant and sanitizer products, and are used to remove the applied disinfectant and sanitizer solution from hard surfaces. Because the towels are not saturated with disinfectant and sanitizer solutions to kill the pathogens which they absorb, they can actually spread infectious pathogens to other surfaces during the cleaning process by initially retaining absorbed pathogens into the towel and then releasing them onto other surfaces which are wiped.

There is, therefore, a need to provide an article which effectively disinfects, sanitizes and deodorizes organic debris by breaking a biofilm surface and disinfecting and sanitizing underneath the film without the use of abrasive particulates. There is also a need for a one-step disinfecting and sanitizing article which is safe, portable, convenient to use, and has multiple disinfecting and sanitizing properties. There is a further need to provide a system of cleaning pathogens that will achieve increased contact time with the pathogens and will thus result in a 100% kill. In addition, there is a need to provide a disinfecting and sanitizing article which is able to disinfect and sanitize a surface and absorb the pathogens therein without spreading unwanted pathogens to other surfaces.

SUMMARY OF THE INVENTION

It is, therefore, an object of this invention to provide a disinfecting and sanitizing article comprising an oil in water liquid disinfectant and sanitizer emulsion which does not contain abrasive particles, but which is incorporated onto an abrasive substrate so that biofilm barriers can be dissolved and/or broken without scratching the treated surface.

It is another object of this invention to provide a disinfecting and sanitizing article comprising an oil in water liquid disinfectant and sanitizer emulsion incorporated into an abrasive substrate so that dried-on surface soils and contaminants can be loosened so as to allow complete penetration of the oil in water liquid disinfectant and sanitizer emulsion for optimal disinfection and sanitizing, but does not leave any particulate residue which would necessitate rinsing or removal thereof.

It is also an object of this invention to provide a oil in water liquid disinfectant and sanitizer emulsion incorporated onto a towel or cloth-like substrate, thus extending wetting time and allowing germs or other organic debris to be contacted for an optimal time by contacting the germs with the liquid disinfectant by using a cloth, without the need to spray a liquid cleaner several times to achieve the necessary effective contact time.

It is a further object of this invention to provide a safe and portable disinfecting and sanitizing article which is convenient to use in a one-step disinfecting, sanitizing and deodorizing process, effectively disinfecting and sanitizing without the need for precleaning the treated surface.

It is another object of this invention to provide a non-toxic disinfecting and sanitizing article so that the liquid cleaner emulsion in the article need not be rinsed from the treated surface.

It is still another object of this invention to provide an oil-in-water emulsion of a germ-killing disinfecting and sanitizing liquid that is saturated onto an abrasive non-woven towel, to provide a longer contact time through slower dry time on the pathogens for a more complete kill than found with either water or alcohol solutions often used to dilute disinfectants and sanitizers.

It is yet another object of this invention to provide a cleaning article incorporating a towel saturated with a disinfecting and sanitizing emulsion which can absorb pathogens into the saturated towel to guarantee the complete kill of the pathogens which have been absorbed therein, and to prevent the pathogens from being transferred to other surfaces because of the disinfecting and sanitizing effect of the formulation saturated into this towel.

It is still an additional object of this invention to provide a disinfecting and sanitizing article which can be disposed of after use without cross-contamination during the waste removal process.

To accomplish these and other related objects of the invention, a disinfecting and sanitizing article is provided comprising a substrate, such as a cloth-like towel similar to that described in U.S. Pat. No. 4,833,003 to Kimberly-Clark, presenting an abrasive surface and being capable of absorbing and retaining an oil in water emulsion of a fluid comprising disinfectants and sanitizers absorbed in the substrate. Initial disinfecting and sanitizing action is achieved by the combination of the abrasive surface of the substrate and the disinfectant and sanitizing emulsion. Further disinfecting and sanitizing action is achieved after the biofilm of a contaminant has been broken or dissolved by the combination of the emulsion and the abrasive substrate. Still further disinfecting and sanitizing action occurs within the substrate when the pathogens are absorbed into the substrate which has been saturated with disinfectants and sanitizers. The article further comprises a plurality of towels having the emulsion absorbed therein and provided in a continuous rolled cylinder housed in a sealed container, the axis of the cylinder being aligned in an essentially vertical orientation within the container, and a lid associated with the container and having an opening for receiving towels therethrough.

DESCRIPTION OF THE PREFERRED EMBODIMENTS

A disinfectant and sanitizer article is provided comprising an abrasive substrate and a pathogen killing disinfecting and sanitizing emulsion incorporated therein. The abrasive substrate of the preferred embodiment comprises a cloth-like towel having at least one abrasive surface. The abrasive surface can be formed in several different manners from a number of different materials. According to one embodiment of this invention, the towel can be similar to that described in U.S. Pat. No. 4,833,003 to Kimberly-Clark entitled "Uniformly Moist Abrasive Wipes" issued May 23, 1989, which is herein incorporated by reference in its entirety. The towel encompassed within the scope of this invention has two opposed surfaces. An abrasive component is permanently attached to or an integral part of at least one surface of the towel, although it is possible for the abrasive component to be present on both surfaces.

The term "abrasive" as used herein refers to an abrasive ingredient or component which, as discussed above, comprises a surface texture that enables the towel to produce a mild scrubbing, scouring or abrading action to effectively break biofilms, such as dried blood, saliva, food grease, or other similar contaminants, and remove dried or embedded organic debris from a surface to be treated, while not harming that surface by scratching or the like. The degree of abrasiveness can vary widely, depending primarily upon the abrasive component on the substrate and the degree of texture which is formed by such abrasive component. Typically, the abrasive surface is somewhat coarse and roughened as compared to a smooth surface of the towel. In accordance with a preferred embodiment of this invention, the preferred abrasive towel is adequately mildly abrasive so as to avoid scratching or otherwise harming the surface intended to be disinfected or sanitized by the towel, while having sufficient abrading qualities to effectively break biofilm layers on the treated surface. Although the abrasive properties are very mild in the sense of not cutting or scratching the surface being disinfected or sanitized, the texture is relatively high so as to remove dried or embedded organic debris from the object being disinfected and sanitized.

This abrasive component may comprise a layer of fibers and/or globules bonded to the surface of a substrate, such as a layer of fibers or fiber bundles and minute, generally spherical masses having a wide range of acceptable diameters, namely from about 40 microns to about 200 microns. Due to the irregular nature of such fibers and globules it is recognized that the diameter is approximate, as such fibers and globules typically are not perfectly round. These fibers and globules can be formed from polymeric materials by known means, such as by melt blowing, bonding, spinning and the like. It is not necessary to incorporate a combination of fibers and globules, as it is possible to utilize either component by itself as the abrasive. Alternatively, the abrasive component may comprise any number of known particulates which can function as an abrasive when bonded onto a substrate.

To be optimally effective, the abrasive component of this invention can account for a minimum of 10% and a maximum of 90% of the surface area of the abrasive side of the towel, with the remaining side having a smooth surface for wiping. It is anticipated that both sides of the towel can have abrasive components incorporated thereon, and that the percentage of abrasive component on each side can differ as desired for a particular application.

In addition, the towel must be capable of absorbing and retaining a predetermined amount of fluid, such as the liquid disinfectant and sanitizer emulsion formulation of the present invention, sufficient to provide a uniformly moist towel. The absorbent character of the towel encompassed herein is achieved by a system of voids or pores which absorb and tightly retain the liquid disinfectant and sanitizer emulsion formulation, such as by capillary action. The towel should also be capable of readily releasing the liquid during use. The specific void or pore volume of the structure of the towel regulates the amount of fluid which can be retained in the towel. In one embodiment, the towel is comprised of a non-woven material which has an affinity to absorb the fluid and is able to absorb or otherwise retain organic debris which has been removed from the treated surface.

The non-woven material contemplated for use with this invention can be any of a number of substrates. These fibers can be natural or manufactured, both regenerated and synthetic, as long as they incorporate the characteristics listed above. These fibers can include polypropylene, polyester nylon, rayon, cotton, wood pulp, cellulose, polyethylene, polyvinyl, viscose, polyurethane, and blends thereof.

The liquid disinfectant and sanitizer composition which is incorporated into the towel is an oil-in-water emulsion formulation capable of killing highly resistant pathogens such as mycobacterium tuberculosis (TB), salmonella choleraesuis, staphylococcus aureaus, psedumonas aeroginosa, and many other like pathogens including viral, mold, and hepatitis. The emulsion formulation has a viscosity sufficient for being easily absorbed into the pores or voids of the towel through capillary action. The emulsion of a preferred embodiment comprises pathogen killing agents, such as quaternary ammonium chloride, ortho phenyl phenol, and paratertiary amyl phenol, water, mineral oil, non-ionic surfactant, organic solvent, and a pH modifying agent.

An example of the acceptable ranges of ingredients of the formulation embodied by this invention is as follows:

EXAMPLE 1

| Ingredients | Acceptable Range |
|---|---|
| Pathogen killing agents | 0.255–10.5 |
| Organic Solvent | 10–30 |
| Nonionic surfactant | 0.5–2.0 |
| pH modifier | 0.1–2.0 |
| Mineral oil | 0.5–3.0 |
| Water | 50–87.4 |

The acceptable ranges of ingredients associated with a preferred formulation in accordance with this invention is as follows:

EXAMPLE 1A

| Ingredients | Acceptable Range |
|---|---|
| Dual chain quaternary (N-alkyldimethylethylbenzyl choloride, N-alkyldimethylethylbenzyl ammonium chloride) | 0.25–2.0 |
| Ortho phenyl phenol | 0.0025–2.0 |
| Parateriary amyl phenol | 0.0025–2.0 |
| Isopropyl alcohol | 10–40 |
| Tergitol 15-S-5 | 0.5–2.0 |
| Citric acid | 0.1–2.0 |
| Mineral oil | 0.5–3.0 |
| Water | 50–87.4 |

A specific example of the formulation of example 1A follows:

EXAMPLE 1B

| Ingredients | % by weight |
|---|---|
| Dual chain quaternary (N-alkyldimethylethylbenzyl choloride, N-alkyldimethylethylbenzyl ammonium chloride) | 0.25 |
| Ortho phenyl pheno | 0.0125 |
| Parateriary amyl phenol | 0.0025 |
| Isopropyl alcohol | 20.0 |
| Tergitol 15-S-5 | 0.5 |
| Citric acid | 0.4 |
| Mineral oil | 0.7 |
| Water | 78.135 |

The dual chain quaternary ammonium chloride, ortho phenyl phenol, and para tertiary phenol are the agents that kill pathogens. Alternative ingredients may be used in the formulation to replace either the dual chain quaternary ammonium chloride, ortho phenyl phenol, or para tertiary amyl phenol. Some examples of these substitutes would include iodine and glutaraldyde.

The organic solvent in one embodiment is isopropyl alcohol, which in addition acts as a synergist for these agents to effect a more complete and faster kill. Alcohols work by denaturing the proteins of the microorganisms (pathogens). As an alternative to isopropyl alcohol, ethanol, methanol, glycol, and glycol ethers may also be used for the same purpose. It is understood that the organic solvent as defined in this formulation can also comprise various combinations of these solvents.

The Tergitol 15-S-5 is a non-ionic surfactant that permits the emulsification of mineral oil into water, which ultimately performs as the vehicle for the entire formula. Although Tergitol 15-S-5 is the preferred surfactant and emulsifying agent in the formulation of this invention, similar emulsions can also be prepared using other non-ionic or anionic surfactants.

Citric acid is used to control the pH, as the phenols have enhanced disinfecting and sanitizing properties in a slightly acidic medium. In addition, the citric acid functions to remove noxious odors. It is understood that other acids including oxalic acid may be used to accomplish the same purpose.

Mineral oil is used as the part of the emulsion system which aids the emulsion formulation in achieving slower dry time of the liquid, thus permitting longer exposure of the germ killing ingredients to the pathogens for a more effective kill. A similar effect can also be obtained by using refined vegetable oils. As an additional benefit, mineral oil can also function as a skin conditioner in skin cleaning applications.

The following are additional examples of disinfectant formulations using some of the ingredients discussed above. These examples are illustrative, and not meant in any way to limit the scope of this invention.

EXAMPLE 2

A disinfecting and sanitizing article may be made by combining a oil in water liquid emulsion with an abrasive cloth-like towel. The following ranges of ingredients comprise a liquid disinfectant and sanitizer formulation in accordance with this invention:

| Ingredients | Range of % by weight |
|---|---|
| Dual quaternary ammonium chloride compounds (50% conc.) | 0.25–5.0 |
| Orthophenyl phenol | 0.0025–5.0 |
| Paratertiaryamylphenol | 0.0025–5.0 |
| Isopropyl alcohol (99%) | 10–4.0 |
| Tergitol 15-S-5 | 0.5–2.0 |
| Citric Acid | 0.1–2.0 |
| Mineral Oil | 0.5–3.0 |
| Water, deionized | 38–87.4 |
| Glutaraldehyde | 0.25–2.5 |
| Iodine | 0.005–2.0 |

The functions of several of the ingredients in this formulation are described above. Of those not described above, the dual quaternary ammonium chloride compounds are disinfectants. Preferably, the dual quaternary ammonium chloride compounds are n-alkyl (60% C14, 30% C16, 5% C12, 5% C 18) dimethyl benzyl ammonium chloride and n-alkyl (68% C12, 32% CH) dimethyl ethyl benzyl ammonium chloride in an equal ratio.

The following are specific examples of disinfectant and sanitizer emulsion formulations using variations of the ingredients disclosed above. These examples are not meant in any way to limit the scope of this invention.

EXAMPLE 3

| Ingredients | % By Weight |
|---|---|
| Glutaraldehyde | 0.25 |
| Dual quaternary ammonium chloride compounds (50% conc.) | 0.50 |
| Orthophenyl phenol | 0.70 |
| Paratertiaryamylphenol | 0.70 |
| Isopropyl alcohol (99%) | 40.0 |
| Tergitol 15-S-5 | 0.60 |
| Citric Acid | 0.50 |
| Mineral Oil | 0.80 |
| Water, deionized | 55.95 |

EXAMPLE 4

| Ingredients | % By Weight |
|---|---|
| Iodine | 0.20 |
| Dual quaternary ammonium chloride compounds (50% conc.) | 0.50 |
| Orthophenyl phenol | 0.80 |
| Paratertiaryamylphenol | 0.80 |
| Ethanol | 40.0 |
| Tergitol 15-S-5 | 0.50 |
| Citric Acid | 0.40 |
| Mineral Oil | 0.70 |
| Water, deionized | 56.10 |

EXAMPLE 5

| Ingredients | % By Weight |
|---|---|
| Dual quaternary ammonium chloride compounds (50% conc.) | 2.0 |
| Orthophenyl phenol | 1.0 |
| Paratertiaryamylphenol | 1.0 |
| Methanol | 40.0 |
| Tergitol 15-S-5 | 1.5 |

-continued

| Ingredients | % By Weight |
|---|---|
| Citric Acid | 0.5 |
| Mineral Oil | 0.9 |
| Water, deionized | 53.1 |

EXAMPLE 6

| Ingredients | % By Weight |
|---|---|
| Glutaraldehyde | 2.5 |
| Iodine | 2.0 |
| Dual quaternary ammonium chloride compounds (50% conc.) | 0.5 |
| Orthophenyl phenol | 0.5 |
| Paratertiaryamylphenol | 0.5 |
| Glycol | 35.0 |
| Tergitol 15-S-5 | 1.0 |
| Citric Acid | 2.0 |
| Mineral Oil | 3.0 |
| Water, deionized | 53.0 |

EXAMPLE 7

| Ingredients | % By Weight |
|---|---|
| Glutaraldehyde | 0.25 |
| Iodine | 0.20 |
| Dual quaternary ammonium chloride compounds (50% conc.) | 0.50 |
| Orthophenyl phenol | 0.50 |
| Paratertiaryamylphenol | 0.50 |
| Isopropyl alcohol (99%) | 20.00 |
| Tergitol 15-S-5 | 0.50 |
| Citric Acid | 0.40 |
| Mineral Oil | 0.70 |
| Water, deionized | 76.45 |

In preparing a preferred embodiment of the disinfecting and sanitizing article, a plurality of abrasive towels are provided, preferably in a continuous, perforated roll of towels. The line of perforation presents a line of weakness by which said towels can be easily separated. Said towels are inserted on-end into a selectively resealable, preferably cylindrical container, with the axis of the cylinder being aligned in an essentially vertical orientation. Of course, it is anticipated that an alternative preferred embodiment of this invention could provide a stack of individual towels instead of the continuous roll of towels. The liquid disinfectant and sanitizer emulsion is then added to the container, preferably by pouring the same over the roll of towels, thereby saturating the towels within the container. A combination of the viscosity of the emulsion and the capillary action associated with the void volume of the towel as discussed above causes the fluid to be distributed evenly throughout the roll of towels.

An example of a suitable container for holding the towels comprises an essentially airtight lid on the top portion thereof which can be selectively sealed, said lid comprising a hinged cap having an opening positioned thereunder. This opening allows for the passage of towels from the interior of the sealed container via the opening, whereby individual towels can be removed by pulling the towel and tearing the same off of the roll at the perforated line located between each individual towel. The opening is appropriately sized to provide means for removing excess liquid from each individual towel as it is removed from the container.

In use, an individual towel is removed from the container as described above. When properly prepared, the towel contains an amount of the liquid disinfectant and sanitizer emulsion sufficient to disinfect and sanitize the treated surface and thoroughly remove organic debris. As the towel is rubbed on the surface, it releases the liquid disinfectant and sanitizer and allows it to have extended contact time with the bacteria and other pathogens on the treated surface. It also provides for continuous disinfecting and sanitizing without the need for additional applications of the liquid. The abrasive character of the towel works with the liquid disinfectant and sanitizer to break the biofilm without leaving any abrasive residue on the treated surface, which residue would otherwise necessitate rinsing the surface with water after the disinfecting and sanitizing process to thoroughly remove the abrasive residue. In addition, the pathogens which are absorbed into the towel during the disinfecting and sanitizing process are killed by the action of the emulsion impregnated into the towel, to prevent the pathogens from being transferred to other surfaces. Further, the nature of the disinfecting and sanitizing article facilitates cleaning without leaving a toxic layer which needs to be rinsed and/or wiped with additional towels or other tools. In one embodiment, the towel is comprised of a non-woven polypropylene which is able to absorb organic debris so as to achieve a thoroughly disinfected surface.

This disinfecting and sanitizing article is useful in disinfecting and sanitizing non-porous surfaces in hospitals, facilities, health clubs, schools, medical offices, veterinary facilities, hotels, restaurants, public facilities, and day care facilities, and is also effective in disinfecting and sanitizing skin.

From the foregoing, it will be seen that this invention is one well adapted to attain all the ends and objects hereinabove set forth together with other advantages which are obvious and which are inherent in its applications.

It will be understood that certain limitations are of utility and may be employed without reference to other limitations. This is contemplated by and is within the scope of the claims.

Since many possible applications may be made of this invention without departing from its scope, it is to be understood that all matter herein set forth is to be interpreted as illustrative and not in a limiting sense.

Having thus described the invention, we claim:

1. An abrasive disinfecting and sanitizing article comprising:

a substrate presenting two opposed surfaces, and having an abrasive ingredient permanently forming a part of at least one said surface, said substrate presenting a matrix capable of absorbing and retaining other components therein; and an emulsion formulation absorbed in the substrate and retained by said matrix, said emulsion comprising:

10–40% by weight organic solvent;

0.5–20% by weight of a surfactant characterized by the ability to form a water and oil emulsion;

0.255–10.5% by weight pathogen killing agents;

0.5–3% by weight mineral oil; and

50–87.4% by weight of water;

whereby said substrate maintains its abrasive quality in the presence of said emulsion and an abrasive disinfecting and sanitizing action is achieved by the combination of said emulsion and the abrasive ingredient on the surface of said substrate.

2. An abrasive disinfecting and sanitizing article as set forth in claim 1, wherein said substrate comprises a towel.

3. An abrasive disinfecting and sanitizing article as set forth in claim 2, wherein said towel presents two (2) abrasive surfaces.

4. An abrasive disinfecting and sanitizing article as set forth in claim 1, wherein said surfactant comprises a nonionic surfactant.

5. An abrasive hand cleansing article as set forth in claim 1, wherein said organic solvent comprises isopropyl alcohol.

6. An abrasive hand cleaning article as set forth in claim 1, wherein said emulsion further comprises 0.1–2% by weight pH modifying agent.

7. An abrasive disinfecting and sanitizing article as set forth in claim 1, wherein said pathogen killing agents are selected from the group comprising dual chain quaternary (N-alkyldimethylethylbenzyl choloride, N-alkyldimethylethylbenzyl ammonium chloride), ortho phenyl phenol, and parateriary amyl phenol.

8. An abrasive disinfecting and sanitizing article comprising:

a substrate comprising a towel presenting two opposed surfaces, and having an abrasive ingredient permanently forming a part of at least one said surface, said substrate presenting a matrix capable of absorbing and retaining other components therein;

an emulsion formulation absorbed in the towel, said emulsion comprising:

10–40% by weight organic solvent;

0.5–20% by weight of a surfactant characterized by the ability to form a water and oil emulsion;

0.255–10.5% by weight pathogen killing agents;

0.5–3% by weight mineral oil; and

50–87.4% by weight of water;

whereby said substrate maintains its abrasive quality in the presence of said emulsion and an abrasive disinfecting and sanitizing action is achieved by the combination of said emulsion and the abrasive ingredient on the surface on said towel;

a plurality of said towels being provided in a selectively sealable, essentially airtight container having a hollow interior in which said plurality of towels are housed, and a means for closure associated therewith, said closure means comprising an opening therein for receiving said towels therethrough, whereby an individual said towel incorporating said emulsion can be removed from the interior of said container through said opening.

9. A method for preparing a disinfecting and sanitizing article, said method comprising:

providing a plurality of towels, said towels presenting two opposed surfaces, and having an abrasive ingredient permanently forming a part of at least one said surface, said towel being capable of absorbing and retaining fluid while maintaining its abrasive quality;

providing an emulsion incorporated onto said towel, said emulsion comprising:

10–40% by weight organic solvent;

0.5–20% by weight of a surfactant characterized by the ability to form a water and oil emulsion;

0.255–10.5% by weight pathogen killing agents;

0.5–3% by weight mineral oil; and

50–87.4% by weight of water;

providing a selectively sealable container having a hollow interior in which said plurality of towels are housed, said container having a means for closure comprising an opening therein;

placing said plurality of towels into the interior of said container;

adding said emulsion to said plurality of towels in said container to thereby appropriately moisten said towels with a predetermined amount of said emulsion; and sealing said closure means on said container to provide an essentially airtight container.

10. An abrasive disinfecting and sanitizing article comprising:

a substrate comprising a towel presenting two opposed surfaces, and having an abrasive ingredient permanently forming a part of at least one said surface, said surface presenting a matrix capable of absorbing and retaining other components therein;

an emulsion comprising 10–40% by weight organic solvent; 0.5–20% by weight of a surfactant characterized by the ability to form a water and oil emulsion; 0.255–10.5% by weight pathogen killing agents; 0.5–3% by weight mineral oil; and 50–87.4% by weight of water, said emulsion being absorbed in the towel, whereby cleansing action is achieved by the combination of said emulsion and the abrasive ingredient on the surface on said towel and whereby said substrate maintains its abrasive quality in the presence of said emulsion;

a plurality of said towels being provided in a selectively sealable, essentially airtight container having a hollow interior in which said plurality of towels is housed, and a means for closure associated therewith, said closure means comprising an opening therein for receiving said towels therethrough, whereby an individual said towel incorporating said emulsion can be removed from the interior of said container through said opening.

* * * * *